(12) United States Patent
Van Dongen et al.

(10) Patent No.: US 7,422,706 B2
(45) Date of Patent: *Sep. 9, 2008

(54) PROCESS TO PREPARE A HYDROGEN AND CARBON MONOXIDE CONTAINING GAS

(75) Inventors: Franciscus Gerardus Van Dongen, Amsterdam (NL); Winnifred De Graaf, Amsterdam (NL); Thian Hoey Tio, Amsterdam (NL); Anthonij Wolfert, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1007 days.

This patent is subject to a terminal disclaimer.

(21) Appl. No.: 10/493,323

(22) PCT Filed: Oct. 22, 2002

(86) PCT No.: PCT/EP02/11804

§ 371 (c)(1),
(2), (4) Date: Apr. 21, 2004

(87) PCT Pub. No.: WO03/036166

PCT Pub. Date: May 1, 2003

(65) Prior Publication Data

US 2004/0241086 A1    Dec. 2, 2004

(30) Foreign Application Priority Data

Oct. 22, 2001  (EP) ................... 01204009

(51) Int. Cl.
*C01B 3/24* (2006.01)
*C01B 3/26* (2006.01)
*F28F 19/00* (2006.01)
*F28F 19/02* (2006.01)

(52) U.S. Cl. ............... 252/373; 165/133; 165/134.1; 423/418.2; 423/650; 423/652

(58) Field of Classification Search ............ 423/418.2, 423/652, 650, 653, 654; 252/373; 165/133, 165/134.1
See application file for complete search history.

(56) References Cited

U.S. PATENT DOCUMENTS 2,647,041 A * 7/1953 Robinson ............ 423/651
4,581,157 A * 4/1986 Twigg ................. 252/373
4,690,690 A   9/1987 Andrew et al. ........ 48/214
4,919,844 A   4/1990 Wang ................. 252/373
6,162,267 A * 12/2000 Priegnitz et al. ...... 48/199 FM
6,224,789 B1  5/2001 Dybkjaer ............. 252/373
6,242,112 B1  6/2001 Forsberg et al. ...... 428/679
6,274,113 B1 * 8/2001 Heyse et al. ......... 423/418.2
6,960,333 B2 * 11/2005 Blanda et al. ........ 423/376

FOREIGN PATENT DOCUMENTS

| EP | 0168892 | 1/1986 |
| EP | 0171786 | 2/1986 |
| EP | 0291111 | 11/1988 |
| EP | 0326662 | 8/1989 |
| EP | 0819775 | 1/1998 |
| EP | 1043084 | 10/2000 |
| EP | 1043084 | 12/2001 |
| WO | 95/31579 | 11/1995 |
| WO | 96/33454 | 2/1996 |
| WO | 96/39354 | 12/1996 |
| WO | 97/22547 | 6/1997 |

OTHER PUBLICATIONS

Translated: Husemann R.U.:Werkstoffe und Ihre Gebrauchseigen-Schaften Fuer Ueberhitzer-Und Zwischen-Ueberhitzerrohre n Kraftweren MIT Erhoehten Dampeparametern . . . Essen, De, vol. 79, Nr. 9, pp. 84-87.
International Search Reported dated Jun. 5, 2003.
Husemann R.U.:Werkstoffe und Ihre Gebrauchseigen-Schaften Fuer Ueberhitzer-Und Zwischen-Ueberhitzerrohre n Kraftweren MIT Erhoehten Dampeparametern . . . Essen, De, vol. 79, Nr. 9, pp. 84-87.
Oil & Gas Jrnl, vol. 69, No. 36, "Partial Oxidation Grows Stronger In U.S.", C.J. Kuhre, et al., pp. 85-90.

* cited by examiner

Primary Examiner—Wayne Langel

(57) ABSTRACT

A process for the preparation of hydrogen and carbon monoxide containing gas from a gaseous hydrocarbon feedstock by performing the following steps:
(a) partial oxidation of part of the feedstock thereby obtaining a first gaseous mixture of hydrogen and carbon monoxide; and,
(b) catalytic steam reforming of part of the gaseous feedstock in a Convective Steam Reformer having a tubular reactor provided with one or more tubes containing a reforming catalyst, wherein the exterior of the tubes of the tubular reactor is used to cool the hot gas as obtained in step (a) and wherein the exterior of the tubes is a metal alloy surface having between 0 wt % and 20 wt % iron.

11 Claims, No Drawings

PROCESS TO PREPARE A HYDROGEN AND CARBON MONOXIDE CONTAINING GAS

FIELD OF THE INVENTION

The invention is directed to a process for the preparation of a hydrogen and carbon monoxide containing product gas mixture from a gaseous hydrocarbon feedstock, by subjecting part of the gaseous feedstock to a partial oxidation step to obtain a first product mixture and part of the gaseous feedstock to an endothermic reaction in the presence of steam and/or carbon dioxide performed in a fixed bed tubular reactor to obtain a second product mixture, wherein the first product mixture is reduced in temperature by contacting said gas with the exterior of the tubular reactor.

BACKGROUND OF THE INVENTION

Such a process is described in EP-A-168892 of applicant in 1986. According to this publication the endothermic reaction is preferably carried out in a fixed bed situated in at least one pipe in which a temperature of between 800 and 950° C. is maintained by routing at least part of the hot product gas from the partial oxidation along the pipe(s). According to this publication the combined partial oxidation and endothermic production of synthesis gas result in a better yield of synthesis gas, an increased $H_2/CO$ ratio, a lower usage of oxygen per $M^3$ of syngas product obtained and a lower capital cost of the plant for the production of CO and $H_2$-containing gas mixtures. An example of the process as described in EP-A-168892 is described in EP-A-326662.

EP-A-171786 discloses a similar process as EP-A-168892. The difference is that the product gas having the elevated temperature is not prepared by means of partial oxidation of natural gas but in a conventional reformer furnace wherein burners provide the required heat. This first process gas is then cooled in a so-called Enhanced Heat Transfer Reformer (EHTR) by routing this gas along the exterior of tubular pipes of the EHTR. EHTR reactors and the like are generally referred to as Convective Steam Reformer (CSR). These pipes contain a fixed bed of catalyst for performing an endothermic reforming reaction using a second part of the natural gas feed. The mixture of carbon monoxide and hydrogen as obtained within the tubes could be considered to be the second product gas. The product gas as obtained in the conventional reformer contains approximately 33% steam.

U.S. Pat. No. 6,224,789 discloses a similar process as described above except that the product gas having the elevated temperature is prepared from natural gas in a so-called Autothermal Reformer (ATR) in the presence of a Ni-containing catalyst and steam. The hot product gas is then contacted with the exterior of the reactor tubes of an EHTR like reactor.

The tubes of a Convective Steam Reformer are typically made from metal alloys comprised substantially of iron. Iron containing alloys are preferred because of their mechanical strength in combination with their relative low cost. Furthermore, usage of these alloys makes it possible to manufacture the complicated tube structures of such an apparatus. A disadvantage of the above apparatus is that in use, coke will form on the exterior surface of the tubes because part of the carbon monoxide reacts to form carbon and carbon dioxide. Furthermore, part of the surface will erode, eventually resulting in an unacceptably low mechanical integrity of the tubes. These effects are especially significant when the amount of steam in the hot gas is below 50 vol %. Such a hot CO and $H_2$ containing gas, is for example, obtained when performing a partial oxidation of natural gas, refinery gas, methane and the like in the absence of added steam as described in WO-A-96/39354. There is thus a need for an improved process if one intends to operate a partial oxidation and a reforming process in combination, as for example described in EP-A-168892 or in EP-A-326662.

The object of the present invention is to provide a process having the advantages of the process of EP-A-168892 or EP-A-326662 wherein less or no coke formation and/or erosion on the exterior of the reactor tubes occurs.

SUMMARY OF THE INVENTION

This object is achieved when the following process is used. A process for the preparation of hydrogen and carbon monoxide containing gas from a gaseous hydrocarbon feedstock, the process comprising:
(a) partial oxidation of part of the feedstock thereby obtaining a first gaseous mixture of hydrogen and carbon monoxide and
(b) catalytic steam reforming of part of the gaseous feedstock in a Convective Steam Reformer comprising a tubular reactor provided with one or more tubes containing a reforming catalyst, wherein the exterior of the tubes of the tubular reactor is used to cool the hot gas as obtained in step (a) and wherein the exterior of the tubes is a metal alloy surface comprising between 0 and 20 wt % iron and between 1 and 5 wt % silicon.

DETAILED DESCRIPTION OF THE INVENTION

Applicants found that less erosion and coke formation will occur on the exterior of the reactor tubes of the CSR if a low iron metal alloy surface is applied. It becomes possible to combine the partial oxidation of natural gas as performed in the absence of (a substantial amount of) steam as moderator gas, i.e. generating a hot gas having a steam content of below 50 vol % and more preferred below 15 vol % with a CSR process.

The combination of a partial oxidation and a CSR process is furthermore advantageous because the hot gas generated by the partial oxidation has a higher temperature than the hot gas generated by the conventional reformer. This will enable the processing of relatively more natural gas through the CSR and/or make it possible to operate at a higher conversion of said gas because of the higher possible exit temperature of the catalytic steam reforming section of the CSR apparatus. Preferably the weight ratio of natural gas processed in step (a) and in step (b) is between 0.5 and 3. Another advantage is that the hydrogen to carbon monoxide ratio can be lower relative to the process as disclosed in U.S. Pat. No. 4,919,844, which is advantageous when such a gas is used as feedstock for a Fischer-Tropsch synthesis process, methanol synthesis process or DME synthesis process. Preferred $H_2/CO$ molar ratio of the total synthesis gas product as obtained by the above combined process is between 1.9 and 2.3.

In step (a) the partial oxidation may be performed according to known principles as for example described for the Shell Gasification Process in the Oil and Gas Journal, Sep. 6, 1971, pp 85-90. Publications describing examples of partial oxidation processes are EP-A-291111, WO-A-97/22547, WO-A-96/39354 and WO-A-96/03345. In such processes the feed is contacted with an oxygen containing gas, such as air or pure oxygen or a mixture thereof, under partial oxidation conditions. Contacting is preferably performed in a burner placed in a reactor vessel. Preferably, the partial oxidation is performed in the absence of significant amounts of added steam, and preferably in the absence of added steam, as moderator gas. The gaseous feed is, for examples natural gas, refinery gas, associated gas or (coal bed) methane and the like.

The product gas of step (a) preferably has a temperature of between 1100° C. and 1500° C. and a $H_2$/CO molar ratio of between 1.5 and 2.6, preferably between 1.6 and 2.2.

Step (b) may be performed by known steam reforming processes, wherein steam and the gaseous hydrocarbon feed are contacted with a suitable reforming catalyst in a CSR reactor. Suitable processes of are exemplified in the earlier referred to U.S. Pat. No. 6,224,789 and EP-A-171786. The steam to carbon (as hydrocarbon and CO) molar ratio is preferably between 0 and 2.5 and more preferably between 0.5 and 1. Preferably the feed also comprises an amount of $CO_2$, wherein preferably the $CO_2$ over carbon (as hydrocarbon and CO) molar ratio is between 0.5 and 2. The product gas of step (b) preferably has a temperature of between 600 and 1000° C. and a $H_2$/CO molar ratio of between 0.5 and 2.5.

The gaseous feedstock to both step (a) and (b) may also comprise recycle fractions comprising hydrocarbons and carbon dioxide as may be obtained in earlier referred to downstream processes, such as the Fischer-Tropsch process, which use the CO/$H_2$ containing gas as feedstock.

The invention is also directed to a CSR reactor vessel comprising reactor tubes having a metal alloy surface as exterior and a metal alloy support as the interior.

The temperature of the hydrogen and carbon monoxide containing gas is preferably reduced in step (b) from a temperature of between 1000° C. and 1500° C. to a temperature between 300° C. and 750° C. The temperature of the alloy surface in step (b) is preferably below 1100° C.

The mixture of carbon monoxide as obtained in step (b) may be directly combined with the product gas as obtained in step (a). This may be achieved within the CSR reactor as exemplified in U.S. Pat. No. 4,919,844. Alternatively, the product gas as obtained in step (b) may be fed to step (a) such that the combined mixture is used to cool the reactor tubes of the CSR reactor in step (b).

The present invention is thus directed to a process to reduce the temperature of a hydrogen and carbon monoxide containing gas as prepared by a partial oxidation process by contacting the gas with a metal alloy surface having a lower temperature than the temperature of the gas, wherein the metal alloy surface comprises between 0 and 20 wt % and preferably between 0 and 7 wt % iron. The alloy surface preferably also contains between 0 and 5 wt % aluminium, preferably between 0 and 5 wt % silicon, preferably between 20 and 50 wt % chromium and preferably at least 35 wt % nickel. Preferably the nickel content balances the total to 100%. The metal alloy surface is preferably supported with a metal alloy support layer having better mechanical properties than said surface layer.

It has been found beneficial to have at least some aluminium and/or silicon in the metal alloy surface when the concentration of steam in the hot gas is lower than 50 vol %, preferably lower than 30 vol % and more preferably lower than 15 vol %. Preferably between 1-5 wt % aluminium and between 1-5 wt % silicon is present in said alloy layer under such low steam content conditions. The resulting aluminium oxide and silicon oxide layers will provide an improved protection against coke formation and erosion when the conditions become more reducing at such low steam concentrations. More preferably, next to aluminium and silicon, a small amount of titanium and/or REM (reactive elements) are added to the metal alloy. Examples of REM are $Y_2O_3$, $La_2O_3$, $CeO_2$, $ZrO_2$ and $HfO_2$. The total content of these added compounds is between 0 and 2 wt %.

The metal alloy support layer may be any metal alloy having the required mechanical strength for a particular application. Typically these metal alloys will contain more iron than the surface layer, suitably more than 7 wt % and even up to 98 wt %. Other suitable metals, which can be present in this metal alloy, are chromium, nickel and molybdenum. Examples of suitable metal alloy support layers are carbon steels, austenitic stainless steels, for example the AISI 300 series (examples 304, 310, 316) with a typical Cr content of between 18-25% and Ni content of between 8-22%, cast materials, as for example HK-40, HP-40 and HP-modified, nickel based alloys, for example Inconel 600, Inconel 601, Inconel 690 and Incoloy 800 and ferritic stainless steels, which are Fe based alloys having a low nickel content, e.g. less than 2 wt % and a Cr content of above 12 wt %.

The two layers of metal alloys may be prepared by methods known to one skilled in the art. Preferably the metal alloy composite is made by means of a building-up welding method resulting in a weld-mounted multi-layered metal surface. This method is preferred because it enables one to make difficult tubular structures, as used in a CSR reactor, having the metal alloy surface according to the present invention. Such a method is characterized in that the desired metal alloy for use as the surface layer is first atomized by gas atomization to form a powder of said alloy. Preferably the iron content of said powder is substantially zero. A layer of the metal alloy is subsequently applied on the support metal alloy by built-up welding by plasma powder welding of said powder. After machining the weld metal, a flat metal alloy surface is obtained. Thickness of the surface metal alloy may range from 1 to 5 mm and preferably 1 to 3 mm. The iron content in the metal alloy layer may contain iron in a situation wherein the staring powder did not contain iron. This is due to migration of iron from the support layer to the surface layer during the welding step. Care should be taken to limit the migration of iron to the surface layer such that the end iron content in the surface layer will be below 20 wt % and preferably below 7 wt %. The iron migration effect can be limited by using a low iron-content support layer, increasing the layer thickness and/or by applying the layer in more than one step. A preferred method to perform such a building-up welding method is described in EP-A-1043084, which publication is hereby incorporated by reference. This publication describes a method to obtain coke resistant furnace reactor tubes for a steam cracker process, which is aimed at preparing lower olefins, e.g. ethylene and propylene.

We claim:

1. A process for the preparation of hydrogen and carbon monoxide containing gas from a gaseous hydrocarbon feedstock by performing the following steps:
   (a) partially oxidating part of the feedstock thereby obtaining a first gaseous mixture of hydrogen and carbon monoxide; and,
   (b) steam reforming part of the gaseous feedstock in a convective steam reformer comprising a tubular reactor provided with one or more tubes containing a reforming catalyst, wherein the exterior of the tubes of the tubular reactor is used to cool the hot gas as obtained in step (a) and wherein the exterior of the tubes is a metal alloy surface comprising between 0 wt % and 20 wt % iron and between 1 wt % and 5 wt % silicon.

2. The process of claim 1, wherein the metal alloy surface further comprises between 0 wt % and 5 wt % aluminium, between 20 wt % and 50 wt % chromium and at least 35 wt % nickel and wherein the metal alloy surface is supported with a metal alloy support layer having better mechanical properties than said surface layer.

3. The process of claim 2, wherein the metal alloy comprises more than 30 wt % chromium.

4. The process of claim 2, wherein the metal alloy surface comprises between 1 wt % and 5 wt % aluminium.

5. The process of claim 4, wherein the metal alloy surface comprises between 0 wt % and 2 wt % titanium and/or reactive elements.

6. The process of claim 2, wherein the metal alloy support layer comprises between 7 wt % and 98 wt % iron.

7. The process claim 2, wherein the metal alloy surface layer is applied to the metal alloy support layer by means of a building-up welding method.

8. The process of claim 1, wherein the temperature of the hydrogen containing gas of step (a) is reduced from a temperature of between 1000° C. and 1500° C. to a temperature between 300° C. and 750° C. in step (b).

9. The process of claim 1, wherein the hot gas of step (a) has a hydrogen to CO molar ratio of between 1.5 and 2.5.

10. The process of claim 1, wherein the hot gas used in step (b) comprises less than 15 vol % steam.

11. The process of claim 1, wherein the gaseous feed in step (b) comprises a hydrocarbon gas, steam and carbon dioxide and wherein the steam to carbon molar ratio is between 0.5 and 1 and the $CO_2$ over carbon molar ratio is between 0.5 and 2.

* * * * *